United States Patent [19]

Blackburn et al.

[11] 4,244,743

[45] Jan. 13, 1981

[54] SULFUR CONTAINING REFRACTORY FOR RESISTING REACTIVE MOLTEN METALS

[75] Inventors: Martin J. Blackburn, Kensington, Conn.; Steven Z. Hayden, Clifton Park, N.Y.; Michael P. Smith, Glastonbury, Conn.

[73] Assignee: United Technologies Corporation, Hartford, Conn.

[21] Appl. No.: 32,197

[22] Filed: Apr. 23, 1979

[51] Int. Cl.$^3$ .............................................. C04B 35/00
[52] U.S. Cl. ......................................... 106/55; 106/62; 106/63; 106/65; 106/73.2; 106/73.4
[58] Field of Search .................... 106/55, 62, 63, 65, 106/70, 73.4, 73.2

[56] References Cited

U.S. PATENT DOCUMENTS

| | | | |
|---|---|---|---|
| 3,413,232 | 11/1968 | Quinn | 106/70 |
| 3,490,929 | 1/1970 | Layne et al. | 106/65 |
| 3,576,765 | 4/1971 | Vallet et al. | 106/55 |
| 4,035,819 | 7/1977 | Nitta et al. | 106/70 |

*Primary Examiner*—James Poer
*Attorney, Agent, or Firm*—Charles G. Nessler

[57] ABSTRACT

Improved refractories for resisting attack of molten titanium aluminum and similar metals are provided by the inclusion of sulfur. Metal, oxygen, and sulfur combinations, wherein sulfur is present at from 10 to 60 atomic percent, are particularly useful.

Disclosed is a material having the atomic formula $M_aS_bO_c$ where O is oxygen, S is sulfur, and M is at least one metal selected from the scandium subgroup of the periodic table transition metals (scandium, yttrium and the rare earths) and aluminum. In an alternate material, M is comprised of at least two elements, the first selected as above and the second selected from the alkaline earth metal group. A preferred material is formed by mixing and firing CaS and $Y_2O_3$ in proportions which results in $(Ca+Y)_{0.43}S_{0.14}O_{0.43}$.

11 Claims, No Drawings

SULFUR CONTAINING REFRACTORY FOR RESISTING REACTIVE MOLTEN METALS

The Government has rights in this invention pursuant to Contract No. F33615-74C-1140 awarded by the U.S. Air Force.

BACKGROUND OF THE INVENTION

1. This invention relates to the field of metal casting, in particular to crucibles and molds for casting of reactive metal alloys such as those of titanium and aluminum.

2. Recently, there has been heightened interest in alloys of the titanium-aluminum system, most particularly those generally of the $Ti_3Al$ (alpha-2) type and the TiAl (gamma) type. These alloys have the potential for serving in aircraft at higher temperatures than current titanium alloys and have much lower densities than the presently used nickel and iron based alloys. Experimental studies have shown that the titanium aluminum alloys present problems in melting and casting, insofar as reaction with materials heretofore known for containing titanium and aluminum. The alloys melt in the range of about 1450° to 1650° C.; for casting several hundred degrees of super heat is often desired. Thus, they tend to present melting and casting problems analagous to titanium, rather than aluminum based alloys.

As there has been little experience with casting titanium aluminum alloys, the prior art is only related to alloys comprised mostly of either titanium or aluminum. Both of these alloy systems have presented difficulty insofar as melting crucibles are concerned. Titanium alloys in particular have presented problems insofar as expendable molds are concerned.

In the melting of titanium based alloys, only water cooled copper crucibles have been found to be commercially useful. The melting point and reactivity of the molten metal causes container degradation and contamination of the casting with virtually all common refractories. Studies, such as reported by Garfinkle et al., in Transactions of the American Society for Metals, Vol. 58, pages 520–530 (1965), indicate the reactivity of molten titanium with various carbides, borides and silicides. Garfinkle et al. found cerium sulfide to have the greatest resistance, but dissolution was still said to be significant. Undoubtedly, certain laboratory chemicals may be resistant to titanium. But for commercial success, a container material must additionally have a satisfactory cost and availability and be formable into desired shapes. None has met all these criteria heretofore.

In conventional investment casting, the time of exposure of the mold material to molten alloy is relatively limited, compared to the crucible used for melting. Nonetheless, mold materials for casting titanium alloys still present a problem. When the mold materials usable with iron and nickel base alloys, such as metal oxides of silicon, zirconium and aluminum, are used for casting titanium alloys it is found that there is unacceptable interaction and introduction of debilitating oxygen into the casting. Molds of rammed graphite or metal oxide molds lined with graphite are usable for titanium alloys but excess carbon is found in an embrittled casting surface. Katz et al. U.S. Pat. No. 3,180,632 describes the use of a metal oxide such as yttria to coat a graphite mold and reduce interaction. Monolithic graphite containers present limitations on the types of shapes which can be formed; graphite-containing molds cannot be fired in conventional furnaces with oxidizing atmospheres. Molds with refractory metal linings, such as metal oxide molds having tungsten powder linings, and described in Brown et al. U.S. Pat. No. 3,537,949, present cost and manufacturing impediments. Other prior patent art on the foregoing types of molds is recited in Basche U.S. Pat. No. 4,135,030.

Compared to titanium, aluminum melting and casting is somewhat easier. Although the metal is quite reactive and reduces its own otherwise stable oxide, aluminum base alloys on the whole have considerably lower melting points than titanium alloys. Clay bonded silicon carbide and certain oxide materials are found to be suitable. But aluminum technology does not provide any useful materials for alloys containing substantial titanium, including titanium aluminum alloys, probably because of the higher melting point and reactivity of such alloys.

Thus, there is a need for improved materials for melting and casting of titanium aluminum alloys and other similarly reactive materials. An improved container material will be either unreactive, or have products of reaction which are not deleterious to the alloy, and will have a cost and availability which will make it commercially feasible.

SUMMARY OF THE INVENTION

An object of the invention is to provide a material which is nonreactive with molten titanium aluminum alloys or similarly reactive metals and which is fabricable into many shapes for melting casting.

According to the invention, vessels for containing or receiving molten metals contain one or more metal from the alkaline earth group and scandium subgroup of transition metals of the periodic table, with oxygen and sulfur. One manner of forming a preferred material is to admix an oxide of a scandium subgroup metal, such as oxides of yttrium, scandium and the rare earths, with an alkaline earth metal sulfur compound, such as sulfides of calcium and strontium. The general atomic formula for a material of the invention will be $M_aS_bO_c$ where M represents one or more metal, S is sulfur, and O is oxygen and where the subscripts are atomic proportions. Useful ranges of values of the subscripts are: a, 0.40 to 0.45; b, 0.1 to 0.6; c, 0.2 to 0.6. If only a single metal is present, then the metal is selected from the scandium subgroup. If more than one metal is present, then the first metal is selected from the scandium subgroup, and other metals are selected from the group consisting of the scandium subgroup, alkaline earth metals, and aluminum; preferred subscript ranges will be a, 0.41 to 0.45; b, 0.02 to 0.24; c, 0.31 to 0.57.

A useful particular combination for casting titanium aluminum alloys, comprises the designation of the element M as yttrium. In such a yttrium, sulfur, and oxygen combination, it is further possible to diminish the oxygen content to the point where essentially only yttrium and sulfur are present. Another preferred material in accord with the above formulae is the combination of calcium, yttrium, sulfur, and oxygen, where the specific formula is $$(Ca+Y)_{0.43}S_{0.14}O_{0.43}$$

To fabricate containers in the practice of the invention various conventional powder processing techniques can be used. One manner of forming a material of the aforementioned Ca-Y-S-O type is: admix fine powders of calcium sulfide and yttrium oxide, press the mixture to a shape, and fire the shape. Another approach comprises the use of a nonaqueous slurry of the starting constituents to coat the internal surfaces of a conventional metal oxide investment casting mold, followed by firing of the coated mold prior to the introduction of the casting metal.

When containers are used for the casting of titanium aluminum alloys, contamination from mold material is advantageously reduced. Specifically, oxygen and sulfur contaminations appear reduced below those attainable by the separate use of a metal sulfur compound or a metal oxide compound. It is believed that the invention will be usable for casting of other high temperature reactive metals, particularly those of the titanium subgroup of the periodic table. Further, through the use of metal oxides with metal sulfides, containers are lower in cost than those made of useful metal sulfides alone, and thus are more likely to be commercially feasible.

DESCRIPTION OF THE PREFERRED EMBODIMENT

The preferred embodiment and the scope of the invention are described in terms of performance with titanium aluminum alloys, most particularly the alloy TiAl, comprising 54 atomic percent aluminum. However, it is believed that the invention will be useful for other alloys containing titanium and aluminum with or without the addition of still other elements. It is also expected that the invention may be useful with a variety of other alloys where conventional metal oxide mold materials are unsatisfactory due to high temperature interaction; included in this group are alloys based on zirconium and hafnium.

The invention herein was discovered after much experiment on the interaction of materials with molten TiAl. To give some appreciation of both the scope and advantage of the invention, some of this experimental work will now be described. Basically, the testing comprised contacting molten TiAl at 1550° C. (70° C. over its melting point) with a test material for one half to one hour under an argon atmosphere. After the test period, the metal was allowed to solidify in contact with the experimental material and an initial evaluation was made using metallography. In particular instances, more refined evaluation was undertaken by X-ray image electron probe microanalysis (hereafter, X-ray imaging). The following summarizes the results.

Severe reaction was observed between the melt and both graphite and vitreous carbon; silicon carbide, silicon nitride and boron nitride were almost completely dissolved after one half hour. Yttria stabilized zirconia faired better but was still poor; a high degree of wetting of the material by the melt was observed and there was an extensive interaction zone in the TiAl; this contained both aluminum and yttrium rich particles. A similar degree of wetting and interaction was observed with a calcia stabilized zirconia.

Commercially pure alumina and yttria appeared more compatible with molten TiAl, with little metallographic evidences of reaction. In one respect, the yttria somewhat out performed the alumina in that there appeared to be less wetting and less tendency for the melt to climb the wall of the container. However, while metallography gave no indication of an interaction, X-ray imaging of the TiAl-yttria specimen revealed extensive diffusion of aluminum into the yttria and yttrium into the TiAl. Extensive tests with alumina crucibles of various qualities tended to show that increased surface roughness and porosity increased the degree of attack of the container. Further tests indicated favorable results with sapphire (monocrystalline corundum) and LUCALOX (dense polycrystalline alumina, of the General Electric Company, Fairfield, Connecticut). Thus, while these high density, smooth surfaced materials produced reasonably good performance, it is not however practical to use them in most applications because of their lack of adaptability to easy shaping as required for most expendable molding. Furthermore, a quantitative oxygen analysis of the TiAl revealed that the oxygen content had been increased during the metal's contact with alumina. In addition, closer scrutiny by electron microprobe showed very fine particulate inclusions that were predominantly aluminum and oxygen.

Prior work had shown that the addition of periodic table Group IIIB transition elements resulted in the formation of oxides in a TiAl alloy during melting and solidification by conventional practice. (It was further observed that the addition of yttrium in modest amounts decreased the surface tension of the TiAl melt and reduced the wetting of metal oxide crucibles, thereby indicating its potential for reducing interaction.) Thus, it was anticipated that Group IIIB metal oxides might effectively reduce reactions when included with alumina.

Yttria-alumina and lanthana-alumina materials were prepared by blending fine powders, cold pressing and sintering at 1350° C. Compositions evaluated included $Y_2O_3$-$Al_2O_3$ in 40/60 and 65/35 molar proportions. The surface of the materials was glazed by heating the sintered test piece above about 1850° C. The 40/60 composition was better than the 65/35 composition but both revealed interaction. Tests with 10/90 and 20/80 mixtures were somewhat inconclusive but appeared to indicate somewhat more interaction. Tests with scandia produced an interaction. Tests with various proportions of lanthana and alumina mixtures produced results similar to the yttria-alumina results. Pure lanthana produced a severe reaction, as did calcia. Magnesia and thoria produced less reaction but the melt evidenced oxygen pickup.

The foregoing results of several dozens of tests confirmed that the containment of TiAl presents a substantial problem. Since the presence of oxygen in TiAl castings would degrade properties, more promising materials than those described above were sought. As mentioned, there was some prior work which indicated that a rare earth sulfide, CeS, exhibited improved resistance to titanium. Furthermore, many sulfides of rare earths were assessed to have high free energies of formation and melting points, making them conceptually attractive. Thus, tests were run on cerium sulfide ($Ce_2S_3$), yttrium sulfide $Y_2S_3$ and yttrium oxysulfide $Y_2O_2S$ which had been pressed and sintered in vacuum at 1350° C. The cerium sulfide exhibited substantial interaction according to the standards we applied in our work. Using metallography, in several tests, there was only an extremely slight or no reaction with yttrium sulfide. Less conclusively, the yttrium oxysulfide exhibited similar behavior. Oxygen contents of the TiAl showed a small increase over the baseline levels and were by far the best of the materials heretofore tested. Some dispersed sulfides, presumably titanium sulfides, were found interspersed with the minor amounts of oxides of yttrium and aluminum in the TiAl melted in yttrium sulfide. Thus, it was discovered that yttrium sulfide and yttrium oxysulfide are useful materials for casting TiAl. However, yttrium sulfide reacts with water vapor during storage. Further, both materials are quite expensive. Therefore, further improvements were sought.

Attempts to produce a face coat of yttrium sulfide on an alumina substrate were not successful since the materials separated during sintering at 1350° C. in vacuum. An equimolar mixture of yttrium sulfide and alumina was fabricated using the sintering technique mentioned above and produced dramatically reduced reaction and oxygen in the TiAl compared to prior alumina tests. Some sulfur was found interdendritically within the TiAl.

Thus, it was discovered that the inclusion of alumina with yttrium sulfide as a mixture was feasible and resulted in TiAl with reduced sulfides, but somewhat increased oxygen, compared to yttrium sulfide alone. Although the amount of testing and analysis was limited and the conclusions were preliminary, they nonetheless formed the basis for discovering more improved materials.

Because of its greater thermodynamic stability, yttria was used as a substitute for alumina in further testing. Sulfides of aluminum and zinc were attempted to be included with yttria but their evaluation was abandoned before any melting trials due to processing problems involving reaction with water vapor and generation of hydrogen sulfide. An equimolar mixture of yttria and calcium sulfide (CaS) was pressed, sintered and fired into a test piece. Analysis showed that the molten TiAl increase in oxygen content was very low, of the order of 0.1%, comparable to the best results with yttrium sulfide, and below that expectable with yttrium oxide alone. Although there was a slight degradation of the container surface, the melt was characterized by an absence of substantial sulfides; sulfur content was only about 0.004%. Further testing involving 5 hours of molten TiAl alloy contact indicated that the oxygen content rose to only about 0.3%. Consequently, it was shown that the combination of calcium sulfide and yttria constituted a new and useful material. Furthermore, the nominal weight distribution of the equimolar mixture was 75% yttria and 25% calcium suffide, producing a substantial reduction in cost compared to yttrium sulfide alone. Combinations of a metal, oxygen, and sulfur are further advantageous because they are likely to be stable during storage or processing in the presence of water vapor and oxygen, compared to the sulfides which tend to be reactive.

To form the container material from the admixture, sintering was undertaken in vacuum at 1350° C. Sintering was also done in air in other trials and may be done in other atmospheres as well. The object of sintering is to form a stable complex compound from the constituents. Since there was no significant evolution of gas or other products during firing, it is reasonably concluded that the sintered material has the constituents of the original compounds. The temperature and time of sintering may be varied: The temperature may range from at least 1150° C. to 1650° C. The time of sintering during experiment was nominally one hour, although longer times are of course acceptable and shorter times may be permissible, depending on the fineness and homogeneity of the particulate mixture and the sintering temperature.

On an atomic basis, the equimolar yttria calcium sulfide material can be represented by the atomic formula:

$$(CA+Y)_{0.43}S_{0.14}O_{0.43}$$

where Ca=calcium, Y=yttrium, S=sulfur and O=oxygen and where the subscripts indicate the relative amounts of the elements present. Based on the performance of the aforementioned material, expectable variations in normal practice, and experience with other combinations of materials for resisting molten metals, it is sound to project the range of atomic percentages which are useful. We believe that useful materials are at least defined by the general formula:

$$(Ca+Y)_aS_bO_c$$

where a ranges from about 0.41 to 0.45, b ranges from about 0.02 to 0.24 and c ranges from about 0.31 to 0.57. These ranges are reflective of the composition which results when the molar percentage of calcium sulfide in a CaS-Y$_2$O$_3$ mixture is varied between 10 and 70%, as further discussed below. Of course, minor impurities, such as are present in commercially pure constituents may also be present and the exact atomic formula would be accordingly adjusted. Fundamentally, the combination of calcium sulfide and yttria constitutes the combination of a scandium sub-group metal oxide and an alkaline earth metal sulfide. Based on the periodicity of the chemical elements, other alkaline earth sulfides may be substituted for calcium sulfide. Among those alkaline earths most likely to be useful would be sulfides of strontium and barium, although it is likely the others will be usable as well. Calcium, strontium and barium are more reactive than beryllium and magnesium, having greater affinities for oxygen, and thus are preferred. It was pointed out that yttrium oxide produced better results in combination with the sulfide than did aluminum oxide. Based on considerations similar to those discussed for the sulfide compounds, it would appear that oxides of other elements of the scandium sub-group (including the rare earth lanthanides and actinides) of the transition elements would be useful.

The experimental work shows that it is the combined presence of sulfur and oxygen in a metal complex compound which provides an improved material. As noted previously above, yttrium oxysulfide was found to be an improvement over any metal oxide. And the alumina-yttrium sulfide compound was also found advantageous. Consequently, the common feature which prevails is, in combination, a metal with a high affinity for oxygen and sulfur, together with oxygen and sulfur. If only one metal is present, it is one chosen from the scandium sub-group. If more than one metal, one is from the scandium sub-group while the others are chosen from the group consisting of the alkaline earths, scandium sub-group, and aluminum, or mixtures thereof. Also, it is quite expectable that combinations of one or more different scandium sub-group metal oxides will work favorably in combination with one or more alkaline earth metal sulfides. The oxidation states of the alkaline earth metals are similar; only the +2 ions of these elements are commonly observed. For the metal oxides which appear analagously useful, the scandium sub-group metals are present as +3 ions, although they are capable of combining at other valances. Given this, the range of useful formulae will comprise one or more metals from the alkaline earth group or scandium sub-group of transition metals, in combination with oxygen and sulfur. Thus, this aspect of our invention can be stated as the general formula:

$$(M)_a S_b O_c$$

where M is at least one metal chosen according to the foregoing rules and the ranges of the subscripts are a from about 0.4 to 0.45, b from about 0.02 to 0.6, and c from about 0.2 to 0.6.

The ranges set forth for our useful formulations are based on reasonable projection from the experiments which were undertaken. At one limit, yttrium sulfide was usable; and this would constitute an oxygen portion of zero. At the other limit, it was shown that entirely metal oxide was not an improvement; this would constitute a sulfur portion of zero. The improvement in the performance of a metal oxide refractory is imparted by the incorporation of sulfur. If there is inadequate sulfur, no improvement will result. On the other hand, an entirely metal-sulfur compound without oxygen, while feasible, has a high cost and the material is hygroscopic and hard to handle. So, it may be said that the incorporation of oxygen in a metal sulfur compound improves its stability in moist environment. In summary, there must be sufficient sulfur to impart to the refractory increased thermodynamic stability and improved resistance to molten metal attack, but insufficient sulfur to reach the point of environmental instability. Accordingly, the practical limits for the CaS-Y$_2$O$_3$ material combination are judged to be more than 10% but less than 70% molar CaS. These limits are represented by $(Ca+Y)_{0.41}O_{0.57}S_{0.02}$ and $(Ca+Y)_{0.45}O_{0.31}S_{0.24}$. It is also noteworthy that Y$_2$O$_2$S is also represented by the formula Y$_{0.4}$O$_{0.4}$S$_{0.2}$ and Y$_2$S$_3$ is represented by Y$_{0.4}$S$_{0.6}$. Further, mixtures and other more complex compounds are formulatable. Thus, it is within these contexts that the aforementioned formulae subscript ranges have been derived.

The green pressed preform is sintered in the range of 1400°–1600° C. to produce a container of good density suitable for melting and casting. As an alternate technique, a slurry of the calcium sulfide and yttrium oxide powders can be used to coat the interior surfaces of a conventional investment casting mold of the alumina, silica, zircon types used for nickel alloy casting. Generally, the techniques used will be those such as are described in Brown et al. U.S. Pat. No. 3,537,949, the prior art for coating the interior of molds with refractory metal compounds. A slurry in volume comprised of 9 parts methanol and 1 part mixed powders has been found satisfactory to produce a nominal 0.1 mm coating on the interior of an alumina base mold. After evaporation of the methanol, the mold is fired in air or other atmosphere at temperatures from 1150°–1600° C. to produce a coated mold ready for introduction of metal. The coating thickness may be varied from that indicated to economize on material or provide increased resistance in difficult applications. Other liquid vehicles may be used but water and other materials which react with the sulfide are to be avoided.

The fabrication of articles useful for the melting and casting of titanium aluminum alloys may be accomplished with techniques which are conventional for the forming of complex metal oxide compounds into shapes. By way of example, powders of calcium sulfide and yttrium oxide having a maximum particle size of less than 44 micrometers are blended without a binder and cold pressed with sufficient pressure to a desired shape. Optionally, binders which are volatilized during sintering or remain benignly present in the final material may be used. Also, the particle size and distribution may be varied to suit the requirements of the final article and fabrication process as is well known in current ceramic technology. Generally, fine powders in the range of 5 to 45 micrometer particle size are preferred to produce homogeneous compounds of good density; they will also be preferred when the improved material is applied as a coating. Coarser powders may be lower in cost and permit the more rapid accretion of structures made by particle accumulation.

It is also anticipated that techniques for constructing investment molds, as are conventionally used for nickel and iron based alloy casting, will be usable. The inventive material may be used to make an entire mold, or to only construct the first metal contacting portions. In such instances, it is expectable that a certain amount of binder such as colloidal silica, alumina, or yttria, from 10 to 30 percent, may be included in the improved composition to improve the integrity of the material accreted during the formation of a mold. And while we generally conceive our improved materials to preferably be used unadulterated, occasion may nonetheless arise, as for economic or structural reason, when they may be included in combination with other materials to provide advantage to the combination.

Our improved composition may also be formulated from other combinations of materials containing the essential elements. Examples of this would be the use of metal sulfate compounds in conjunction with metal or metal oxides, the use of elemental metals with metal-oxygen-sulfur compounds, the addition of sulfur to metal oxide complexes, the addition of oxygen to metal-sulfur compounds, and the use of compounds containing extraneous elements which are liberated during the formation of the final product. Other means may reveal themselves as the economic construction of improved containers according to the invention is pursued. And while the preferred process described herein comprises the mixing of particulates, it should be evident from the foregoing recitation that other means and reactions may be used to formulate an improved material in a useful form.

Although this invention has been shown and described with respect to a preferred embodiment, it will be understood by those skilled in this art that various changes in form and detail thereof may be made without departing from the spirit and scope of the claimed invention.

Having thus described typical embodiments of our invention, that which we claim as new and desire to secure by Letters Patent of the United States is:

1. A sintered material for resisting the attack of reactive molten metals having the atomic formula:

$$M_a S_b O_c$$

where O is oxygen and S is sulfur and where M is one element selected from the scandium sub-group of periodic table transition metals (scandium, yttrium and the rare earths) and aluminum or mixtures thereof and where a ranges from about 0.4 to 0.45, b from about 0.1 to 0.6, and c from about 0.2 to 0.6.

2. The material of claim 1 where a ranges from 0.41 to 0.45, b from 0.02 to 0.24, c from 0.31 to 0.57.

3. A sintered material for resisting the attack of molten reactive metal having the formula:

$$M_a S_b O_c$$

where M consists of two elements, M' and M", and wherein M' is a metal selected from the scandium sub-group of transition metals (scandium, yttrium, and the rare earth lanthanides actinides) and aluminum or mixtures thereof and M" is a metal selected from the alkaline earth metal group (beryllium, magnesium, strontium, barium and radium) mixtures thereof and wherein a ranges from about 0.41 to 0.45, b ranges from about 0.02 to 0.24 and c ranges from about 0.34 to 0.57.

4. The material of claim 3 wherein M' is yttrium.

5. The material of claim 4 wherein M" is calcium.

6. The materials of claims 1 or 3 wherein a is about 0.43, b is about 0.14 and c is about 0.43.

7. A material for resisting the attack of reactive molten metal consisting of a mixture of an oxide of a metal selected from the group consisting of the scandium sub-group and aluminum or mixtures thereof, and a sulfide of a metal selected from the alkaline earth group, wherein the sulfide comprises 10 to 70 molar percent of the mixture.

8. A material for resisting the attack of titanium aluminum and like reactive alloys comprising a fine particulate intermixture of yttria and calcium sulfide, wherein calcium sulfide comprises 10 to 70 molar percent of the mixture and wherein the mixture is fired at 1250° C. or higher prior to use.

9. The method of improving the resistance of metal oxide refractories to reactive molten metals which comprises incorporating from 10 to 60 atomic percent sulfur.

10. The method of improving the resistance to molten metal attack of yttrium and aluminum oxide base materials which comprises adding a metal sulfur compound in a quantity which produces up to 60 atomic percent sulfur in the material.

11. The method of improving the resistance to interaction of a vessel for receiving molten reactive metal which comprises providing molten metal contacting surfaces having a composition containing a metal chosen from the group consisting of the scandium sub-group and aluminum or mixtures thereof, in an amount ranging from about 40 to 45 atomic percent, and sulfur in an amount ranging from 10 to 60 atomic percent.

* * * * *

UNITED STATES PATENT AND TRADEMARK OFFICE
CERTIFICATE OF CORRECTION

PATENT NO. : 4,244,743
DATED : January 13, 1981
INVENTOR(S) : MARTIN J. BLACKBURN ET AL It is certified that error appears in the above—identified patent and that said Letters Patent is hereby corrected as shown below:

Column 2, line 31    after "melting" insert --and--

Column 9, line 7     after "magnesium" insert --calcium--

Column 9, line 8     before "mixtures" insert --or--

Signed and Sealed this

Eleventh Day of August 1981

[SEAL]

Attest:

Attesting Officer

GERALD J. MOSSINGHOFF

Commissioner of Patents and Trademarks